United States Patent

Ban

[15] 3,649,030

[45] Mar. 14, 1972

[54] APPARATUS FOR SHIFTING MAGNETIC HEAD IN MULTI-TRACK TAPE PLAYER

[72] Inventor: Itsuki Ban, 829, Higashi-Oizumimachi, Tokyo-to, Japan

[22] Filed: Apr. 15, 1970

[21] Appl. No.: 28,869

[30] Foreign Application Priority Data

Apr. 17, 1969 Japan....................................44/34688

[52] U.S. Cl. ..............................................................274/4 A

[51] Int. Cl. ........................................................G11b 21/08

[58] Field of Search.................274/4 A, 11 A; 179/100.2 CA

[56] References Cited

UNITED STATES PATENTS 3,489,417 1/1970 Harper..................................274/4 B 3,572,723 3/1971 Jenkins..................................274/4 B 3,575,422 4/1971 Peltz....................................274/4 A

*Primary Examiner*—Harry N. Haroian

*Attorney*—Jacobs & Jacobs

[57] ABSTRACT

An apparatus for shifting a magnetic head in multi-track tape player comprising a support member supporting a magnetic head; cam means moving the support member for positioning the magnetic head in opposition to a plurality of discrete and separate record-tracks on the tape; cam driving means including an eccentric frictional wheel rotatably driven upon abutment against a capstan for running the tape, a movable lever member supporting the wheel, and a reduction device transferring rotation of the wheel to the cam member upon reduction thereof; and lock means locking the lever member for maintaining the frictional wheel in the position where the wheel is not rotated by the capstan whereby whenever the lock means disengages the lever member the frictional wheel is rotated through a turn and the cam means is also rotated through a predetermined angle while the magnetic head is moved by one step.

7 Claims, 5 Drawing Figures

APPARATUS FOR SHIFTING MAGNETIC HEAD IN MULTI-TRACK TAPE PLAYER

BACKGROUND OF THE INVENTION

This invention relates to a magnetic head shifting apparatus in multi-track tape player for shifting the magnetic head to play a plurality of record-tracks on the magnetic tape.

A conventional magnetic head shifting apparatus employed in a multi-track channel magnetic tape player is composed of a cam for synchronizing the magnetic head with the record-tracks on the tape to shift the magnetic head across the width of the tape, and driving means for intermittently rotating the cam through a predetermined angle. Such driving means includes a ratchet wheel provided coaxially with the cam, and an electromagnetic plunger for rotatably driving the ratchet wheel through a pawl whereby at every time the electromagnetic plunger is energized in pulse fashion by a record-track change over signal the cam is shifted in single step to position the magnetic head to successive recorded-track positions. Disadvantages derived from the use of the conventional apparatus are such that much electricity is consumed and the manufacturing cost is expensive. More specifically, in order to stably maintain a relative position of the magnetic head and the record-track on the tape, it is required that a support member for supporting the magnetic head should be biased by the strong elastic force against the cam. This requires much drive power for rotating the cam since the frictional force is increased between the cam and the support member. Naturally, the electromagnetic plunger to be used requires a large dimensioned one which consume much electricity. Especially, this is the case with the use of a rotary electric switch associated with the cam for controlling lighting of an indicator lamp to indicate the record-track to be played. To use of the much consumed electromagnetic plunger is undesirable for the magnetic tape player based on a battery as power source. Difficulty is experienced in mounting such large electromagnetic plunger in view of a space therefore. Further, the above-mentioned requires high manufacturing cost. The use of the large dimensioned electromagnetic plunger produces a great impact sound to thus cause an overrun of the cam and a cross-talk thereby being undesirable for sound instruments.

SUMMARY OF THE INVENTION

It is a primary object of the invention to provide a magnetic head shifting apparatus, wherein by utilization of rotational force of a capstan for driving a magnetic tape, cam means is rotatably driven to shift a magnetic head to the position where the head is opposed to a record-track on the tape to be played.

Another object of the invention is to provide a magnetic head shifting apparatus in multi-track tape player, which comprises driving means including a lever member movably provided and movable in one direction by bias means, an eccentric frictional wheel mounted to the lever member, and a reduction device interposed between the eccentric frictional wheel and the cam means; and lock means for the lever member whereby the lock means is disengaged from the lever member the eccentric frictional wheel being pressed and rotated by the capstan under the bias of the bias means and being rotated through a turn to allow the lever member to engage the lock means at the same time the frictional wheel being caused to rest at which time the cam is rotated through a predetermined angle to move the magnetic head is moved to the position where the head plays the next record-track.

A further object of the invention is to provide an apparatus for shifting a magnetic head in multi-track tape player, wherein the lock means includes an electromagnetic device an actuator normally in coupled relation with the lever member, the actuator being moved to the position where it is disengaged from the lever member by energization of the electromagnetic device in pulse fashion by a record-track change signal to thus rotate the eccentric frictional wheel through a turn so that the lever member which has been moved in relation to rotation of the wheel is engaged with the actuator to prevent from further movement of the lever.

Still another object of the invention is to provide an apparatus for shifting a magnetic head in multi-track tape player, wherein a support member for supporting the magnetic head is moved by guide of the shaft of the cam means.

Advantages derived from the use of the apparatus for shifting the magnetic head according to the invention is that since the cam means is rotatably driven by utilization of rotational force of the capstan, the strong drive force is easily obtained for driving the cam means, and that no overrun is caused and no impact sound is produced when the magnetic head is moved as the cam is gently and smoothly rotated.

According to the present invention, the apparatus may be not only manufactured at low cost and does consume less electricity but also eliminates drawbacks presented in the conventional magnetic head shifting apparatus wherein the cam is rotated by the electromagnetic plunger.

These and other objects of the invention will be apparent from the following description and accompanying drawing in which;

DESCRIPTION OF THE PREFERRED EMBODIMENTS

Figure 1:
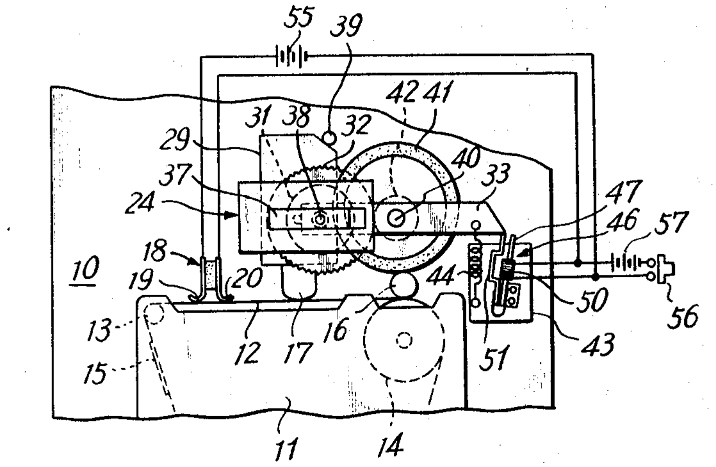
FIG. 1 is a schematic representation showing a magnetic tape player in which one embodiment of an apparatus for shifting magnetic head according to the present invention is employed, partially broken away.
Figure 2:
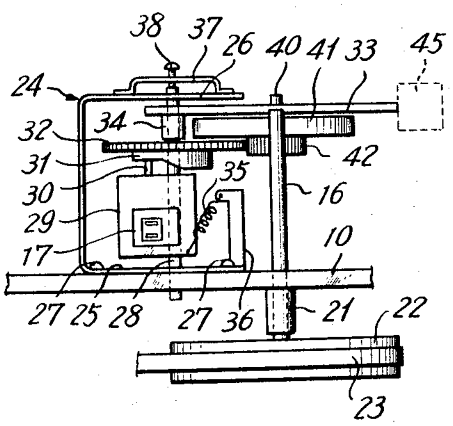
FIG. 2 is a schematic representation showing the tape player in FIG. 1 viewed from the front, with partially broken away except for a portion relative to the present invention.

Referring now to the drawings, and in particularly to FIGS. 1 and 2, the reference numeral 10 designates a horizontal player deck within a housing for an endless magnetic tape cartridge player. An endless magnetic tape cartridge 11 is shown in FIG. 1 as being inserted in the player housing and is positioned by a suitable positioning mechanism (not shown) in a predetermined operative position on the deck 10. The cartridge 11 includes a generally rectangular housing with a centrally disposed reel (not shown) on which an endless magnetic tape 12 is wound and unwound in conventional manner. The tape 12 passes over a guide 13 and a pinch roller 14. The guide 13 and the pinch roller 14 are disposed adjacent the leading edge of the cartridge 11 whereat the cartridge side wall is cut away or dispensed with and the tape 12 is extended from the center of the hub of the reel (not shown) about the guide 13 and thence about the pinch roller 14 back to the outer periphery of a roll formed by the tape wound about the hub. The tape 12 is provided with a conductive patch or end signal spot 15 thereon.

In opposition to the leading edge of the cartridge 11 positioned in the operative position, there is provided on the deck 10, a capstan 16 for driving the tape 12, a magnetic head 17 adapted to transduce the tape 12, and a detector or sensor 18 having a pair of electrically separated feeler contacts 19, 20 shorted by the conductive patch 15 on the tape 12. The capstan 16 is rotatably supported by a suitable bearing 21 mounted to the deck 10 thereunder and extends upwardly of the deck 10 through a hole (not shown) formed on the deck 10. A motor (not shown) is provided under the deck 10 and is adapted to move a flywheel 22 attached to the lower end of the capstan 16 by a belt 23 whereby the capstan 16 is rotatably driven at a preset constant speed. The capstan 16 firmly presses the tape 12 against the pinch roller 14 in its drive relation. The tape 12 which is driven by operation of the pinch roller 14 and the capstan 16 is run passing through the detector 18 and the magnetic head 17.

The magnetic head 17 may be positioned, by an apparatus for shifting a magnetic head as will be described later, at a plurality of different predetermined fixed points across the width of the tape 12, thereby reproducing a plurality of discrete and separate record-tracks upon the tape at these points.

A substantially U-shaped bracket 24 is secured by screws 27 to the deck 10. The bracket 24 is provided with a lower arm 25 closedly fixed to the deck 10, and upper arm 26 upwardly and spacedly parallel to the lower arm. Holes (not shown) are formed to be registered with each other on the upper and lower arms 26, 25 of the bracket 24, and the deck 10, respectively to receive a shaft therein. The shaft 28 is rotatably and slidably supported by the bracket 24 and the deck 10 in the longitudinal direction. The magnetic head 17 is firmly secured to a displaceable support member 29 rotatably and slidably mounted to the shaft 28. The support member 29 has an upwardly extending pin 30. A stepped face cam 31 and a gear 32 are mounted to the shaft 28 and a swing lever 33 is swingably supported over a sleeve 34 by the shaft. A spring 35 is trained between the support member 29 and a bracket 36 mounted on the deck 10. The support member 29 is upwardly and clockwise biased with respect to the shaft 28 by the bias of the spring 35. The end of the pin 30 on the support member 29 comes in contact with the cam face of the face cam 31. The shaft 28 is given an upward movement by the bias of the spring 35 through the support member 29, the pin 30, and the cam 28, however, upward movement of the shaft is prevented by an adjustment screw 38 threaded into a plate member 37 provided on the upper arm 26 of the bracket 24. Clockwise rotation of the support member 29 made by the spring 35 is limited by a stopper pin 39 connected to the deck 10.

The face cam 31 is arranged to shift the magnetic head 17 into a plurality of discrete record-tracks on the tape 12. The face cam 31 comprises a plurality of flat steps different in each height along its peripheral face to oppose each of the record-tracks on the tape. Ramps are provided between the flat steps of the cam 31. The lowest flat step of the cam 31 positions the magnetic head 17 at the highest record-track on the tape 12. This is assured by the pin 30. The pin 30 rides up the adjacent ramps to the next flat step of the cam when the face cam 31 is rotatably driven by one step by a driving means as will be fully described later.

The driving means includes a rubber covered eccentric frictional wheel 41 supported by an axis 40 pivotally mounted to the swing lever 33. The eccentric frictional wheel 41 as will be described later is caused to abut against the capstan 16 by rotation of the swing lever 33 from the position as shown to the clockwise direction and is rotatably driven by the capstan 16. A gear 42 which meshes with the gear 32 is supported with the wheel 41 on the axis 40. The gears 42 and 32 constitute a reducing gearing and rotation of the frictional wheel 40 is reduced to be imparted to the face cam 31. In this instance, a gear ratio of the gear 32 and the gear 42 is 1:4 so that the face cam 31 may be rotated through 90° when the eccentric frictional wheel 41 is rotated through a turn.

Figure 3A:
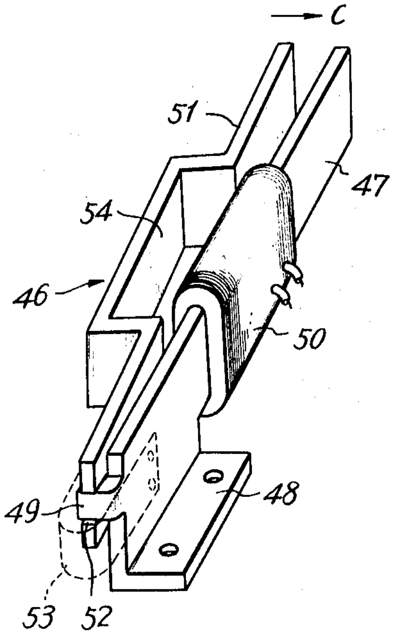
FIGS. 3A and 3B are enlarged perspective views showing the details of the electromagnetic device shown in FIG. 1.
Figure 3B:
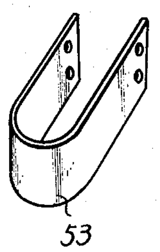

The swing lever 33 is biased by the bias of a spring 44 interposed between a supporter mounted to the deck 10 and the lever 33 to the direction that the wheel 41 abuts against the capstan 16. Swingable movement of the swing lever 33 made by the spring 44 is prevented by a lock means indicated by 45 in FIG. 2 mounted on the supporter 43. The frictional wheel 41 is normally in the position where it is not rotated by rotation of the capstan 16. The electromagnetic device 46 is formed of an electromagnetic device 46 fixed to the supporter 43. The electromagnetic device 46 is shown exaggerated in FIGS. 3A and 3B. The electromagnetic device 46 includes a core 47, and an actuator 51. The core 47 is an elongated shape to which a coil 50 is wound and is provided with a bent portion 48 mounted to the supporter 43. The actuator 51 has a notch 52 at one end to receive a connecting portion 49 formed on the end of the core 47 and is swingably provided by a substantially U-shaped connecting member 53 of a leaf spring. The actuator 51 is normally away at the other end from the core 47 by the bias of the connecting lever 53, as shown in FIG. 3A. Now, the current is applied to the coil 50, and the core 47 attracts the actuator 51 against the bias of the connecting member 53 to swing the actuator 51 in the direction of the arrow C. When the actuator 51 is swung in the direction of the arrow C, the actuator 51 will not come in contact with the coil 50 of the core 47 since a recess 54 is formed of the actuator at a portion opposite to the coil 50. The core 47 and the actuator 51 have wider areas, respectively so that the actuator 51 may be attracted to the core 47 and swung even if less current is applied to the coil.

When the electromagnetic device 46 is deenergized, the free end of the actuator 51 engages the swing lever 33 and rotation of the swing lever 33 made by the spring 44 is prevented.

The coil 50 of the core 47 is connected through the detector 18 to an electrical source 55 and is in turn connected through a pushbutton switch 56 to an electrical source 57. Thus, the electromagnetic device 46 is energized by the electrical source 55 or 57 in response to the feeler contacts 19, 20 of the detector 18 being shorted by the conductive patch 15 on the tape 12 or manual operation of the pushbutton switch 56.

The operation of the magnetic head shifting apparatus of the invention will be apparent from the following description.

During the time the cartridge 11 is played, when the two feeler contacts 19, 20 of the detector 18 is shorted by the conductive patch 15 on the tape 12 or the pushbutton switch 57 is manually operated and closed, the electromagnetic device 46 is energized in pulse fashion by the source 55 or 57 to attractively move the actuator 51 to the position where the actuator is disengaged from the swing lever 33. As a result, the spring 44 biases the swing lever 33 clockwise and the frictional wheel 41 is pressed against the capstan 16 under the bias of the spring 44. Therefore, the eccentric frictional wheel 41 is rotatably driven by rotation of the capstan 16 and rotation of the wheel 41 is transferred through the gears 42, 32 to the face cam 31. Since the eccentric frictional wheel 41 is eccentrically pivoted to the axis 40, rotation of wheel 41 causes the swing lever 33 to counterclockwise swung against the bias of the spring 44 when the capstan 16 engages the minor arc of the wheel. When the frictional wheel 41 is rotated through one half turn, the major arc thereof engages the capstan 16 to critically swing the swing lever 33 in the counterclockwise direction. And, further rotation of the wheel causes the swing lever 33 to clockwise swing under the bias of the spring 44 and to be returned to its original position. Prior to one rotation of the wheel 41, the swing lever 33 which is clockwise swung engages the actuator 51 of the electromagnetic device 46 to prevent its swingable movement. Consequently, abutment force between the eccentric frictional wheel 41 and the capstan 16 is nil, and rotation of the eccentric frictional wheel 41 is prevented when the wheel 41 is rotated through a turn from the beginning. FIG. 1 shows such the condition. As mentioned above, at every time the electromagnetic device 46 is energized in pulse fashion, the wheel 41 is rotated through just a turn. Since the gear ratio of the gear 42 and the gear 32 is 1:4, one rotation of the face cam 31 allows the face cam 31 to rotate through 90°. For this reason, if the flat steps of the face cam 31 are spacedly provided by 90° in numbers of four, the magnetic head 17 is shifted by one step whenever the electromagnetic device 46 is activated. More specifically, the magnetic head 17 may be positioned at four different predetermined fixed points across the width of the tape 12.

Where the tap 11 is provided with, as for example, two tracks, the face cam 31 is also provided with two flat steps by an angle of 180° and the gear ratio of the gear 42 and the gear 32 is 1:2, whenever the electromagnetic device 46 is energized in pulse fashion, the eccentric frictional wheel 41 is rotated through a turn and the face cam 31 is rotated through 180° to alternatively shift the magnetic head to the position where two record-tracks on the tape are played.

By turning the adjusting screws 38, the position of the cam 31 is upwardly and downwardly shifted with the shaft 28. Accordingly, if the position of the magnetic head 17 opposed to the tape 12 is off out of the proper position, it may be adjusted to proper position by adjusting the screw 38.

According to the present invention, since not only the face cam 31 is relatively and gently rotated but also the rotational force of the capstan is utilized, no overrun is caused and operation is stable.

Figure 4:
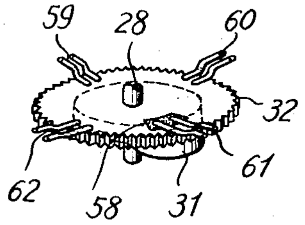
FIG. 4 is a representation schematically shown a switch mechanism operated in relation to rotation of the gear shown in FIG. 1.

FIG. 4 shows a mechanism in which rotation of the gear 32 with the gear 32 is utilized whereby the indication of the record track which has been played is made. In this figure, similar numerals are used to illustrate like parts in FIGS. 1 and 2.

The gear 32 is made of insulating material and includes a conductive foil 58 thereon. Four switch members 59 and 62 are spacedly provided by 90° on an immovable insulating ring (not shown) adjacent the gear 32. The switch members 59 to 62 each is composed of a pair of electrically separated contacts. The two contacts for the switch members 59 to 60 are successively shorted by the conductive foil 58 as the gear 32 is rotated. Therefore, the switch members 59 to 60 are successively closed with respect to upward and downward movement of the magnetic head 17 so that a lighting of a track indicating lamp (not shown) provided opposed to each record-track on the tape may be controlled.

Although the invention has been described with reference to specific embodiments, it is apparent that the invention is not to be limited to the embodiments as illustrated, and, accordingly, changes and variations may be made without departure from the spirit and scope of the invention as defined in the appended claims.

What is claimed is:

1. Apparatus for shifting a magnetic head in multi-track tape player including a capstan for driving a magnetic tape and at least one magnetic head adapted to transduce the tape, said apparatus comprising:

a displaceable support member coupled to the magnetic head for positioning it with respect to a plurality of discrete and separate record-tracks on the magnetic tape;

cam means coactable with the support member for controlling displacement of the magnetic head to play the record-tracks, said cam means having a plurality of successive cam regions spaced apart in correspondence with the record-tracks, said cam regions being constructed to displace the support member to corresponding positions when in individual coaction therewith and thereby position the magnetic head for play with associated record-tracks;

driving means for rotating the cam means in single steps to position the magnetic head to successive record-track positions, said driving means including a rotary shaft to which the cam is coupled, a lever member movably provided, an eccentric frictional wheel rotatably mounted to said lever member in opposition to the capstan, a spring member for biasing said lever member in the direction that said eccentric frictional wheel abuts against the capstan, and a reduction device for reducing and imparting rotation of said eccentric frictional wheel which is driven by abutment against the capstan under the bias of the spring member toward said rotary shaft;

lock means for locking movement of the lever member made by the bias of the spring, said eccentric frictional wheel being locked due to no abutment force between the eccentric frictional wheel and the capstan made by the spring during the time the lever member is locked by the lock means;

control means for controlling operation of said lock means;

said lock means being disengaged from the lever member in response to generation of the record-track changing signal whereby said eccentric frictional wheel abuts against the capstan and is rotated under the bias of the spring member, said lever member being reciprocated in response to rotation of the eccentric frictional wheel, said eccentric frictional wheel being rotated through a turn to return the lever member to the position where the lever member is locked by the lock member to terminate rotation of the eccentric frictional wheel, said eccentric frictional wheel being rotated through a turn to rotate the cam means by means of the reduction gear to thus move the magnetic head by one step.

2. Apparatus for shifting a magnetic head in multi-track tape player in accordance with claim 1, wherein said reduction device of said driving means comprises a gear of small diameter provided coaxially with said eccentric frictional wheel, and a gear of large diameter with said cam means attached to said rotating shaft, said cam means being rotated through an angle corresponding to that formed by adjacent cam regions when said eccentric frictional wheel is rotated a turn.

3. Apparatus for shifting a magnetic head in multi-track tape player in accordance with claim 2, wherein said lever member is swingably supported by said rotatary shaft and is swingably reciprocated in response to rotation of said eccentric frictional wheel.

4. Apparatus for shifting a magnetic head in multi-track tape player in accordance with claim 3, said lock means is formed of an electromagnetic device with an actuator reciprocable by control of the current supply, said actuator being engaged with said lever member when said electromagnetic device is deenergized, said actuator being moved to the position where it is disengaged from said lever member when said electromagnetic device is energized.

5. Apparatus for shifting a magnetic head in multi-track tape player in accordance with claim 4, wherein said control means includes a detector having a pair of electrically separated feeler contacts shorted by a conductive patch provided on said magnetic tape, and an electrical source for supplying a power through said detector to said electromagnetic device, said electromagnetic device being energized in pulse fashion in response to passage of the conductive patch across the detector when the magnetic tape is transported.

6. Apparatus for shifting a magnetic head in multi-track tape player in accordance with claim 4, wherein said control means includes an electrical switch to be closed by its manual operation, and an electrical source for supplying a power through said electrical switch to said electromagnetic device.

7. Apparatus for shifting a magnetic head in multi-track tape player in accordance with claim 2, wherein said displaceable support member is rotatably and slidably supported with respect to said rotatary shaft and a pin one end of which is opposed to said cam regions of said cam means, said displaceable support member being biased by the bias of a tension spring toward the cam means and coupled to the cam means by said pin, rotational force given by the tension spring to said support member being prevented by a stopper engaged with said support member, said support member being only allowed to be slidably moved along the longitudinal axis of the rotatary shaft.

* * * * *